United States Patent
Williams et al.

(10) Patent No.: US 10,127,044 B2
(45) Date of Patent: Nov. 13, 2018

(54) BANDWIDTH INCREASE IN BRANCH PREDICTION UNIT AND LEVEL 1 INSTRUCTION CACHE

(71) Applicant: Advanced Micro Devices, Inc., Sunnyvale, CA (US)

(72) Inventors: Douglas Williams, Mountain View, CA (US); Sahil Arora, Campbell, CA (US); Nikhil Gupta, Sunnyvale, CA (US); Wei-Yu Chen, Fremont, CA (US); Debjit Das Sarma, San Jose, CA (US); Marius Evers, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 318 days.

(21) Appl. No.: 14/522,831

(22) Filed: Oct. 24, 2014

(65) Prior Publication Data
US 2015/0121050 A1    Apr. 30, 2015

Related U.S. Application Data

(60) Provisional application No. 61/895,624, filed on Oct. 25, 2013.

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3848* (2013.01)

(58) Field of Classification Search
CPC .. G06F 9/3806; G06F 9/30058; G06F 9/3861; G06F 9/3802; G06F 9/3804;
(Continued)

(56) References Cited

U.S. PATENT DOCUMENTS 5,574,871 A * 11/1996 Hoyt ................... G06F 9/30054
                                                                  712/200
5,584,001 A * 12/1996 Hoyt ..................... G06F 9/3806
                                                                  712/238
(Continued)

FOREIGN PATENT DOCUMENTS

EP          1 320 031 A2      6/2003

OTHER PUBLICATIONS

Powell, et al. Reducing Set-Associative Cache Energy via Way-Prediction and Selective Direct-Mapping. In: Proceedings of the 34th Annual Symposium on Microarchitecture, 2001, pp. 54-65 [online], [retrieved on Sep. 20, 2016]. Retrieved from the Internet <URL: https://core.ac.uk/download/pdf/12620307.pdf?repositoryId=496 >.*

*Primary Examiner* — Aimee Li
*Assistant Examiner* — Shawn Doman
(74) *Attorney, Agent, or Firm* — Volpe and Koenig, P.C.

(57) ABSTRACT

A processor, a device, and a non-transitory computer readable medium for performing branch prediction in a processor are presented. The processor includes a front end unit. The front end unit includes a level 1 branch target buffer (BTB), a BTB index predictor (BIP), and a level 1 hash perceptron (HP). The BTB is configured to predict a target address. The BIP is configured to generate a prediction based on a program counter and a global history, wherein the prediction includes a speculative partial target address, a global history value, a global history shift value, and a way prediction. The HP is configured to predict whether a branch instruction is taken or not taken.

19 Claims, 8 Drawing Sheets

(58) Field of Classification Search
CPC .... G06F 9/3842; G06F 9/3844; G06F 9/3846; G06F 9/3848
USPC .............................. 712/238, 233, 234, 239
See application file for complete search history.

(56) References Cited

U.S. PATENT DOCUMENTS

| | | | | |
|---|---|---|---|---|
| 5,848,269 | A * | 12/1998 | Hara | G06F 9/322 |
| | | | | 711/213 |
| 7,000,096 | B1 * | 2/2006 | Sinharoy | G06F 9/3848 |
| | | | | 712/239 |
| 7,165,169 | B2 | 1/2007 | Henry et al. | |
| 9,405,544 | B2 * | 8/2016 | Holman | G06F 9/3806 |
| 2003/0065912 | A1 * | 4/2003 | Hum | G06F 9/3848 |
| | | | | 712/239 |
| 2003/0212882 | A1 | 11/2003 | Bonanno | |
| 2004/0225872 | A1 * | 11/2004 | Bonanno | G06F 9/3848 |
| | | | | 712/239 |
| 2005/0216714 | A1 * | 9/2005 | Grochowski | G06F 9/30072 |
| | | | | 712/240 |
| 2005/0268075 | A1 | 12/2005 | Caprioli et al. | |
| 2006/0095745 | A1 | 5/2006 | Tran | |
| 2006/0095750 | A1 * | 5/2006 | Nye | G06F 9/3848 |
| | | | | 712/240 |
| 2006/0101299 | A1 | 5/2006 | Chung | |
| 2007/0083735 | A1 | 4/2007 | Glew | |
| 2007/0083739 | A1 * | 4/2007 | Glew | G06F 9/3848 |
| | | | | 712/239 |
| 2011/0078425 | A1 | 3/2011 | Shah et al. | |

\* cited by examiner

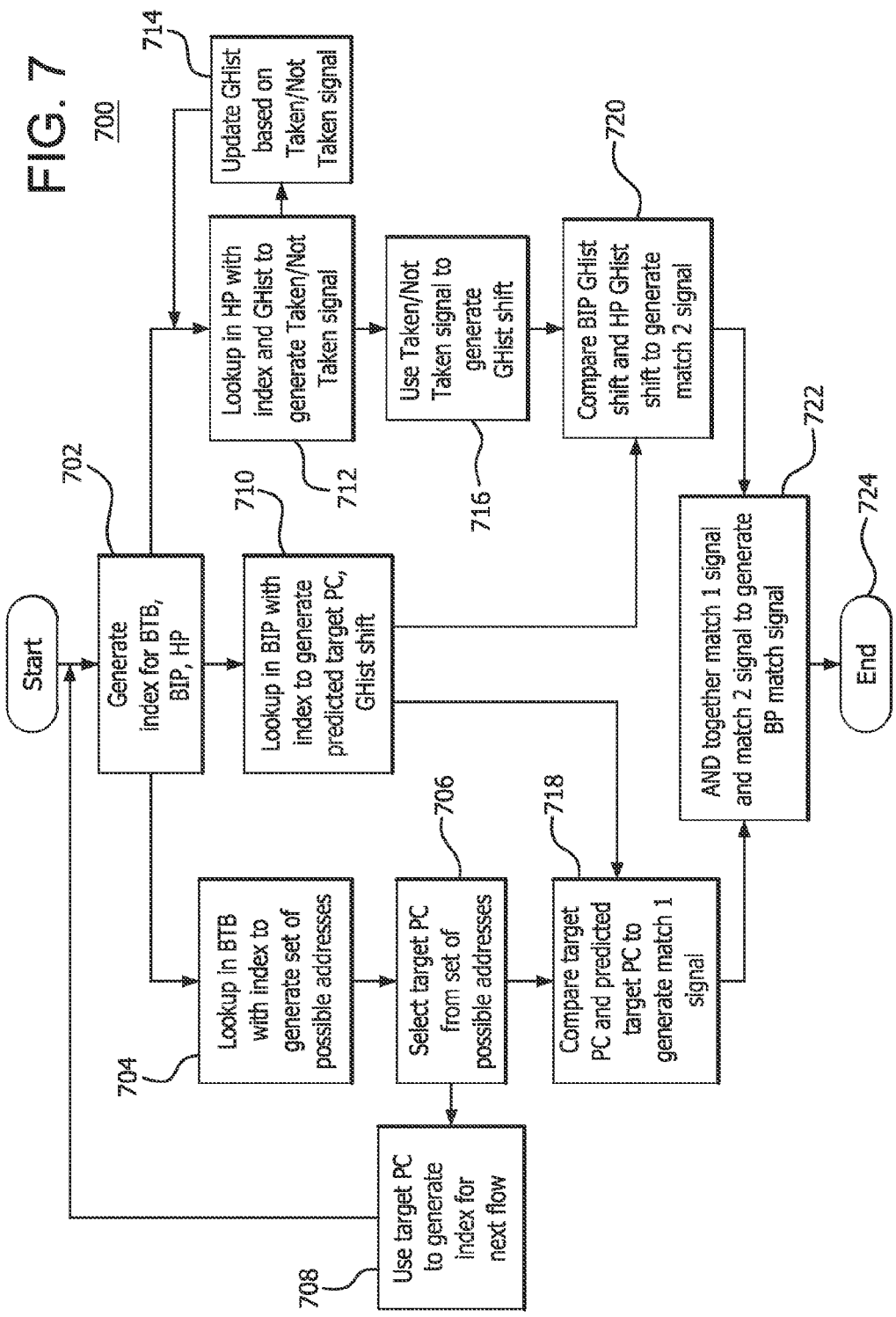

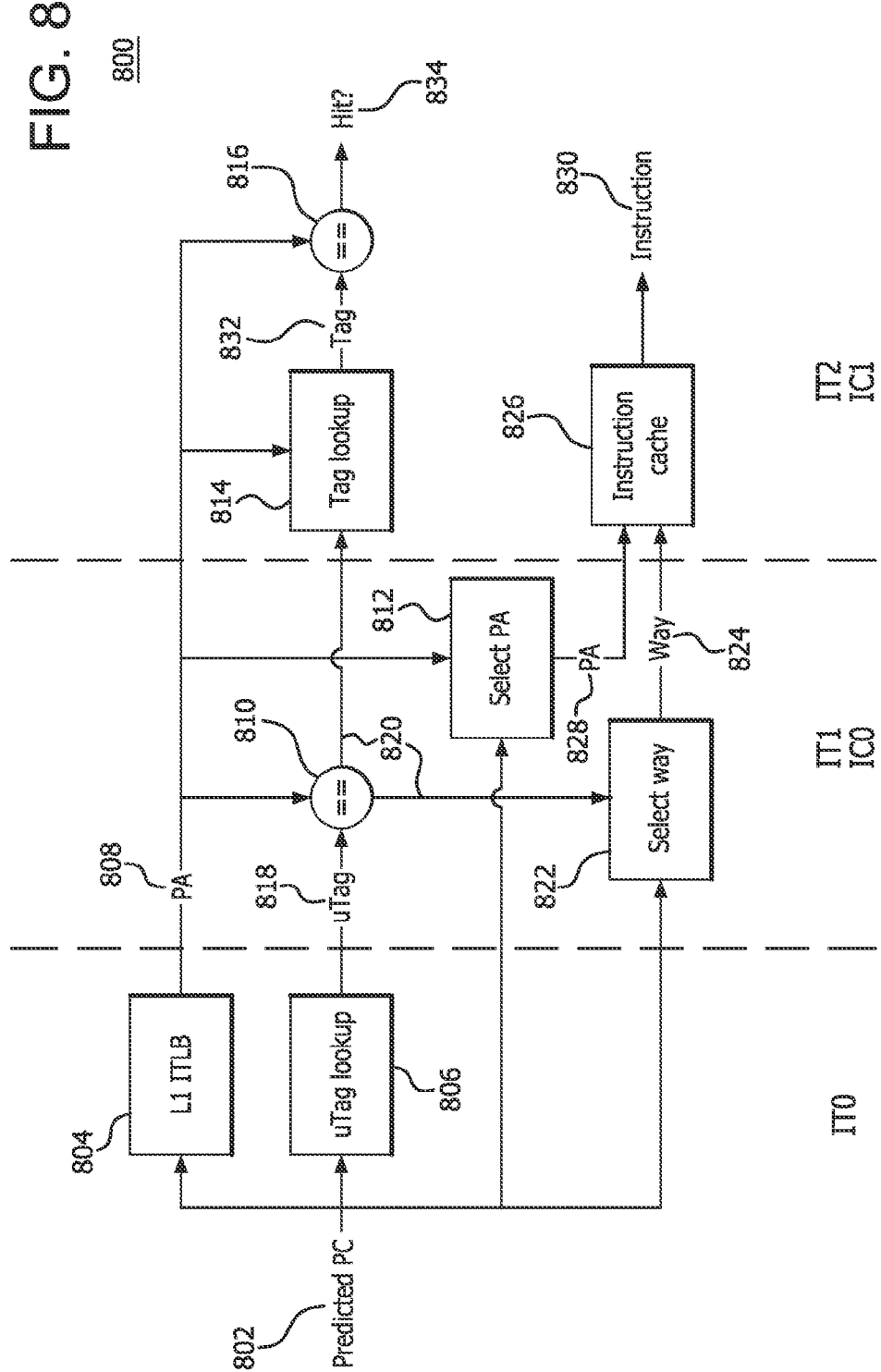

BANDWIDTH INCREASE IN BRANCH PREDICTION UNIT AND LEVEL 1 INSTRUCTION CACHE

CROSS REFERENCE TO RELATED APPLICATION

This application claims the benefit of U.S. Provisional Application No. 61/895,624, filed on Oct. 25, 2013, which is incorporated by reference as if fully set forth herein.

TECHNICAL FIELD

The disclosed embodiments are generally directed to a processor, and in particular, to a branch prediction unit and Level 1 instruction cache in the processor.

BACKGROUND

Processors, including central processing units (CPUs) and graphical processing units (GPUs), are utilized in various applications. A standard configuration is to couple a processor with a storage unit, such as a cache, a system memory, or the like. Processors may execute a fetch operation to fetch instructions from the storage unit as needed. A processor pipeline includes several stages for processing instructions. In one implementation, a four stage pipeline may be used, and includes a fetch stage, a decode stage, an execution stage, and a write-back stage. Instructions progress through the pipeline stages in order.

To speed up the operation of the processor, it is desirable to have a full pipeline. One way of filling the pipeline is to fetch subsequent instructions while previous instructions are being processed. To be able to fetch ahead several instructions, a branch predictor may be used. A branch predictor predicts the direction of a branch instruction (i.e., taken or not-taken) and the branch target address before the branch instruction reaches the execution stage in the pipeline.

This is known as "pre-fetching" an instruction and "speculatively executing" the instruction. An instruction is speculatively executed because it is not known whether the prediction is correct until the branch instruction reaches the execution stage. Although pre-fetching and speculatively executing the instructions without knowing the actual direction of the branch instruction may result in speeding up the instruction processing, it may have the opposite effect and may result in stalling the pipeline if branch directions are mispredicted. If a branch misprediction occurs, the pipeline needs to be flushed and the instructions from the correct branch direction are executed. This may severely impact the performance of the system.

Several different types of branch predictors have been used. A bimodal predictor makes a prediction based on recent history of a particular branch's execution, and provides a prediction of taken or not-taken. A global predictor makes a prediction based upon recent history of all the branches' execution, not just the particular branch of interest. A two-level adaptive predictor with a globally shared history buffer, a pattern history table, and an additional local saturating counter may also be used, such that the outputs of the local predictor and the global predictor are exclusive ORed with each other to provide a final prediction. More than one prediction mechanism may be used simultaneously, and a final prediction is made based either on a meta-predictor that remembers which of the predictors has made the best predictions in the past, or a majority vote function based on an odd number of different predictors.

FIG. 1 is a block diagram of an existing Level 1 branch predictor 100. The branch predictor 100 includes a first predictor (P1) 102, a second predictor (P2) 104, a multiplexer (mux) 106, and a chooser 108. The program counter 110 (the address of the branch being predicted) and other inputs 112 are evaluated by both the first predictor 102 and the second predictor 104, and each makes its own prediction.

The program counter 110 is also supplied as an input to the chooser 108, which uses the program counter 110 to determine which predictor (either the first predictor 102 or the second predictor 104) is more accurate. The chooser 108 makes a prediction choice 114, which is supplied as the selector to the multiplexer 106. The output of the selected predictor is used as the prediction 116 of the branch predictor 100.

FIG. 2 is a block diagram of another existing Level 1 branch predictor 200. In one implementation, the Level 1 predictor 200 may be a McFarling hybrid predictor. The branch predictor 200 is similar in construction to the branch predictor 100, but with a different implementation for some of the components. The branch predictor 200 includes a first predictor 202 (implemented as an array of bimodal counters), a second predictor 204 (implemented as an array of bimodal counters), a multiplexer (mux) 206, and a bimodal chooser 208. Each predictor 202, 204 makes its own prediction. The second predictor 204 includes an XOR unit 210 and an array of bimodal counters 212.

The program counter 220 (the branch address) is supplied as an input to the first predictor 202, the second predictor 204, and the chooser 208. The first predictor 202 bases its prediction on a saturating bimodal two bit counter, indexed by the low order address bits of the program counter 220.

The global history 222 keeps a history of the direction taken by the most recent N branches (indexed by the branch address), and is supplied as an input to the second predictor 204. The XOR unit 210 performs an exclusive OR operation on the program counter 220 and the global history 222, which produces a hash used as an index into the array 212.

The chooser 208 uses the program counter 220 to lookup in a table which predictor (either the first predictor 202 or the second predictor 204) is more accurate. The chooser 208 makes a prediction choice 224, which is supplied as the selector to the multiplexer 206. The selected predictor is used as the Level 1 prediction 226 of the branch predictor 200.

FIG. 3 is a block diagram of an existing Level 2 branch predictor known as a hashed perceptron 300. The hashed perceptron 300 includes a bias weight array 302, a plurality of weight arrays $304_1$, $304_2$, ..., $304_n$, and an adder 306. The program counter 310 is supplied as an input to the bias weight array 302 and the weight arrays $304_1$-$304_n$.

The bias weight array 302 is an array of weights, where each weight is a number of bits (e.g., four or eight). The bias weight array 302 is indexed into using the program counter 310 or a hash of the program counter 310 to obtain a weight value that is supplied to the adder 306.

Each weight array $304_1$-$304_n$ is indexed by a hash of the program counter 310 and different bits of the global history 312 to obtain a weight value. Each weight array $304_1$-$304_n$ includes an XOR unit 314 to produce the hash by performing an exclusive OR operation on the program counter 310 and the portion of the global history 312. The global history is a list of past outcomes of all branches, not including the current branch, whether the branch was taken or not taken. The least significant bits of the global history contain information about the most recent branches encountered, while the most significant bits of the global history contain information about older branches encountered.

The adder 306 adds the weights obtained from the bias weight array 302 and each of the weight arrays $304_1$-$304_n$, to obtain a sum value, and the most significant bit (MSB) of the sum value is the prediction 316. For example, if the MSB of the sum value is "1," then the prediction is "not taken" and if the MSB of the sum value is "0," then the prediction is "taken."

It is noted that in one implementation of the hashed perceptron 300, all of the weight values are sign-extended prior to the addition, to prevent an overflow of the adder 306, which could result in an incorrect prediction. Using a hash function to generate an index into the bias weight array 302 and each of the weight arrays $304_1$-$304_n$ generates a small index (in terms of the number of bits that make up the index), because both the program counter 310 and the global history 312 can each contain a large number of bits.

Branch predictors are typically large and complex structures. As a result, they consume a large amount of power and incur a latency penalty for predicting branches. It is desirable to have better branch prediction, because better branch prediction has an impact on the performance and the power efficiency of the processor.

SUMMARY OF EMBODIMENTS

Some embodiments provide a processor including a front end unit. The front end unit includes a level 1 branch target buffer (BTB), a BTB index predictor (BIP), and a level 1 hash perceptron (HP). The BTB is configured to predict a target address. The BIP is configured to generate a prediction based on a program counter and a global history, wherein the prediction includes a speculative partial target address, a global history value, a global history shift value, and a way prediction. The HP is configured to predict whether a branch instruction is taken or not taken.

Some embodiments provide a method for performing branch prediction in a processor, the processor including a level 1 branch target buffer (BTB) and a BTB index predictor (BIP). An index in generated to use for lookup into the BTB and the BIP. A lookup is performed in the BTB using the index to predict a target address. A lookup is performed in the BIP using the index to predict a speculative partial target address. The target address from the BTB and the speculative partial target address from the BIP are used to generate the index for a next flow.

Some embodiments provide a non-transitory computer-readable storage medium storing a set of instructions for execution by a general purpose computer to perform branch prediction in a processor, the processor including a level 1 branch target buffer (BTB) and a BTB index predictor (BIP). The set of instructions includes a generating code segment, a first performing code segment, a second performing code segment, and a using code segment. The generating code segment generates an index to use for lookup into the BTB and the BIP. The first performing code segment performs a lookup in the BTB using the index to predict a target address. The second performing code segment performs a lookup in the BIP using the index to predict a speculative partial target address. The using code segment uses the target address from the BTB and the speculative partial target address from the BIP to generate the index for a next flow.

BRIEF DESCRIPTION OF THE DRAWINGS

A more detailed understanding may be had from the following description, given by way of example in conjunction with the accompanying drawings, wherein:

FIG. 7 is a flowchart of a method using the BIP to generate a BP match signal; and FIG. 8 is a block diagram of instruction tag (IT) and instruction cache (IC) pipelines.

DETAILED DESCRIPTION

Figure 1:
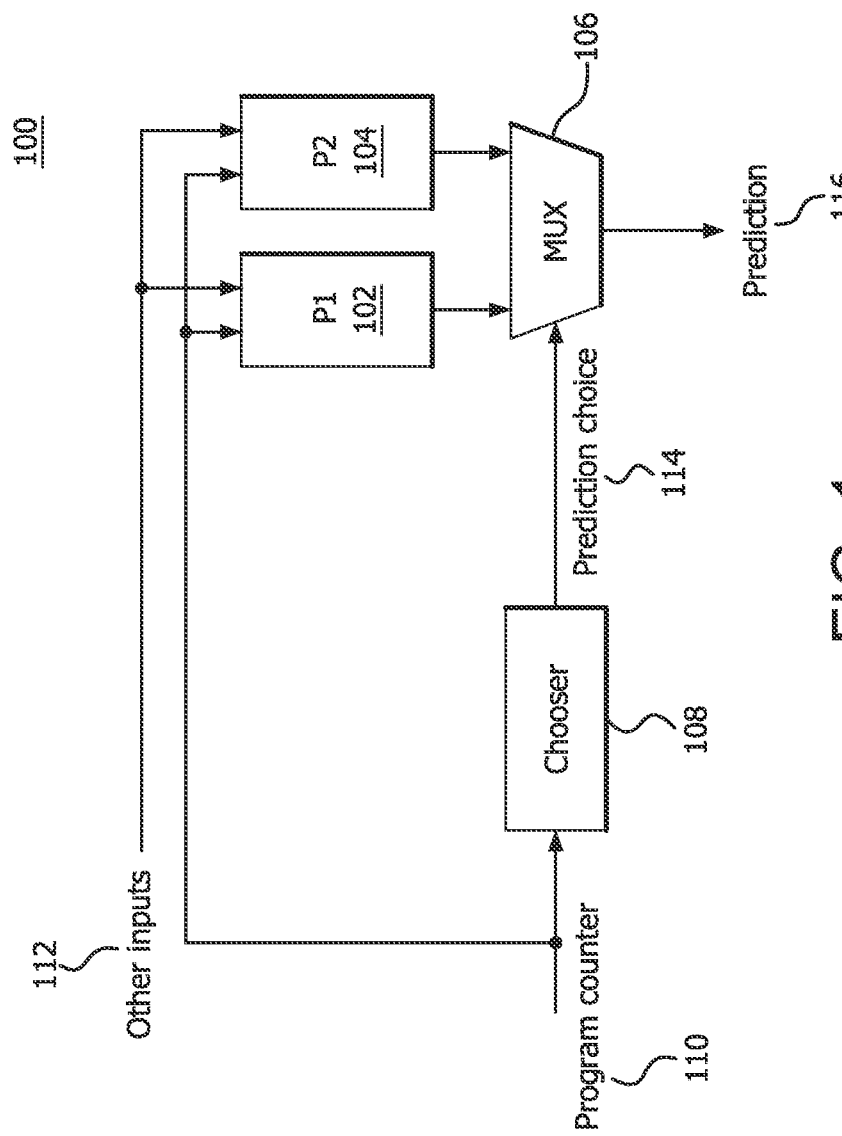
FIG. 1 is a block diagram of an existing Level 1 branch predictor.
Figure 2:
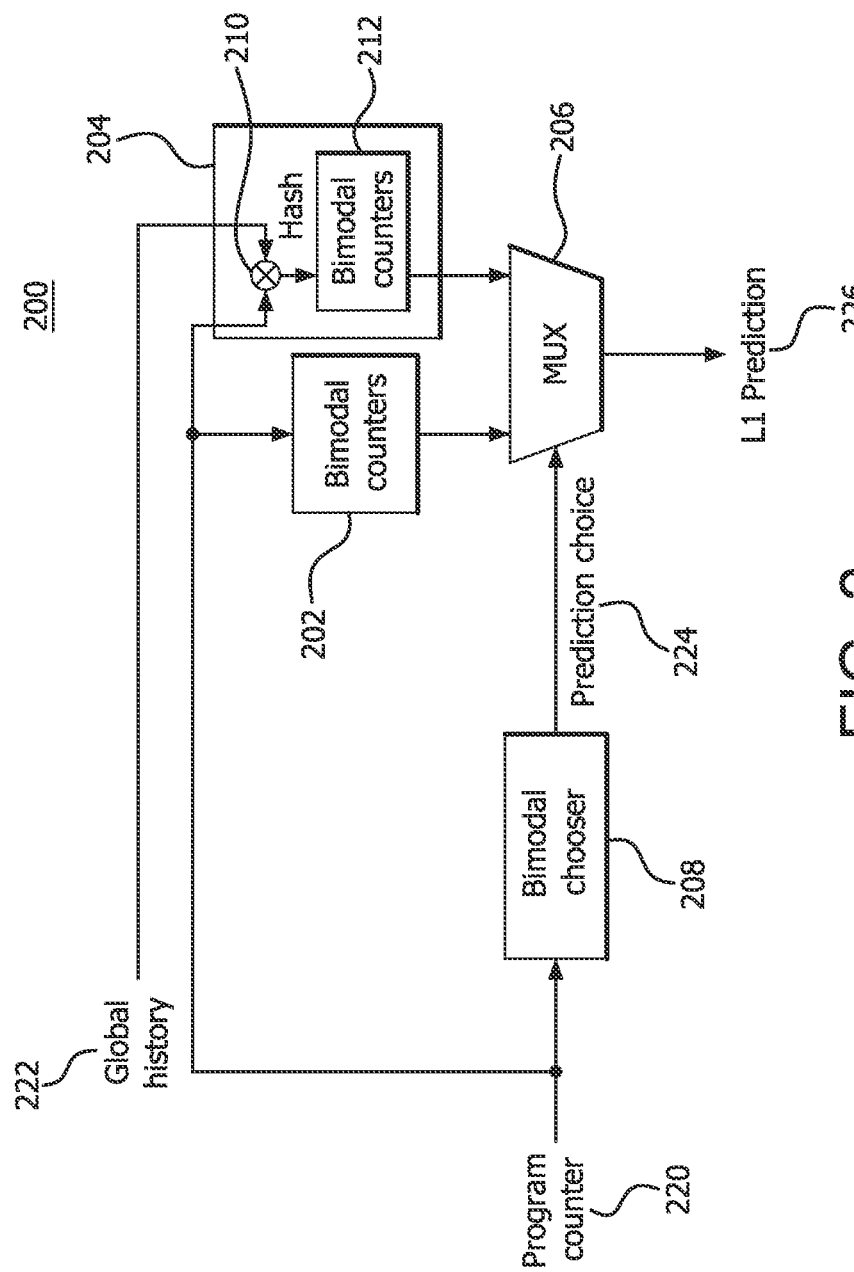
FIG. 2 is a block diagram of another existing Level 1 branch predictor.
Figure 3:
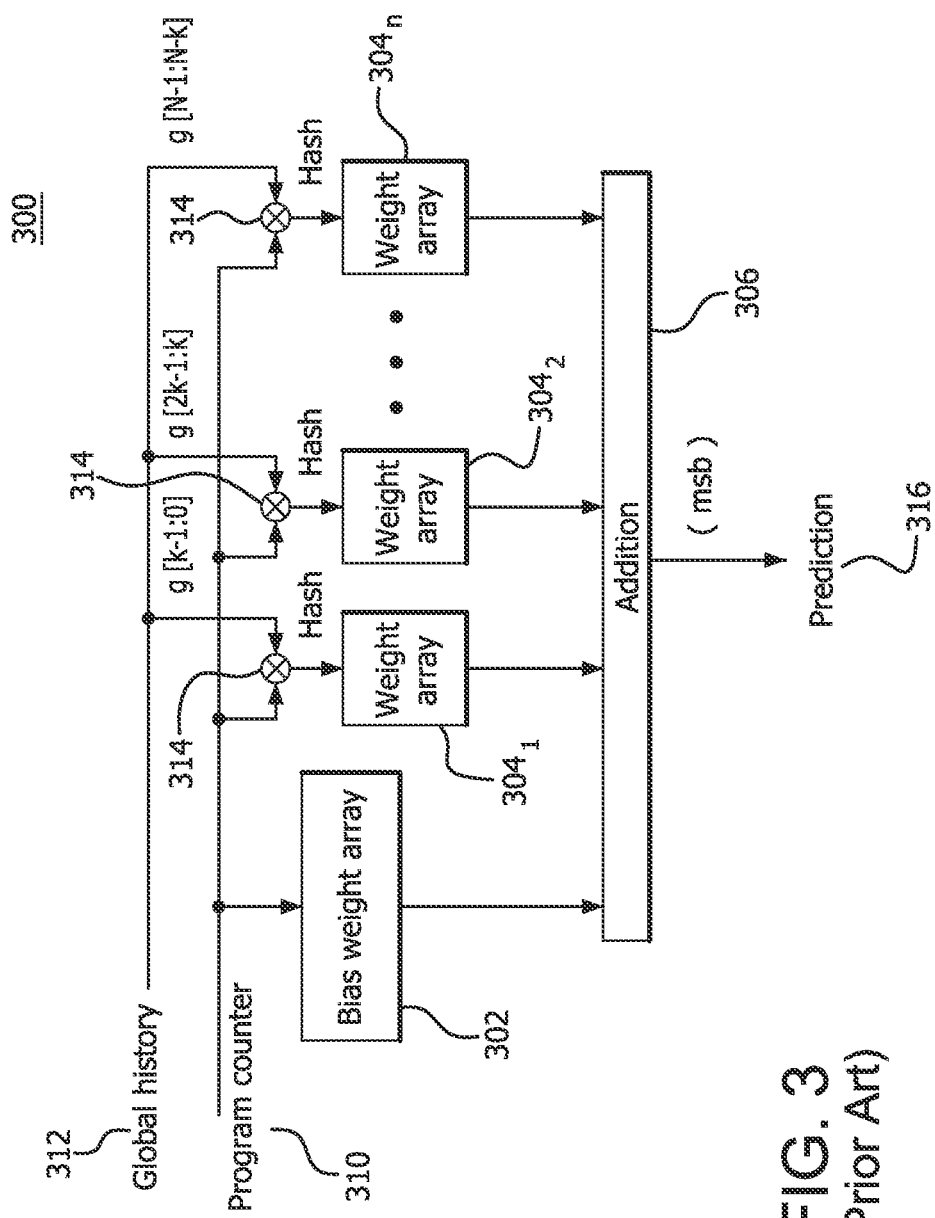
FIG. 3 is a block diagram of an existing Level 2 branch predictor (a hashed perceptron)
Figure 4:
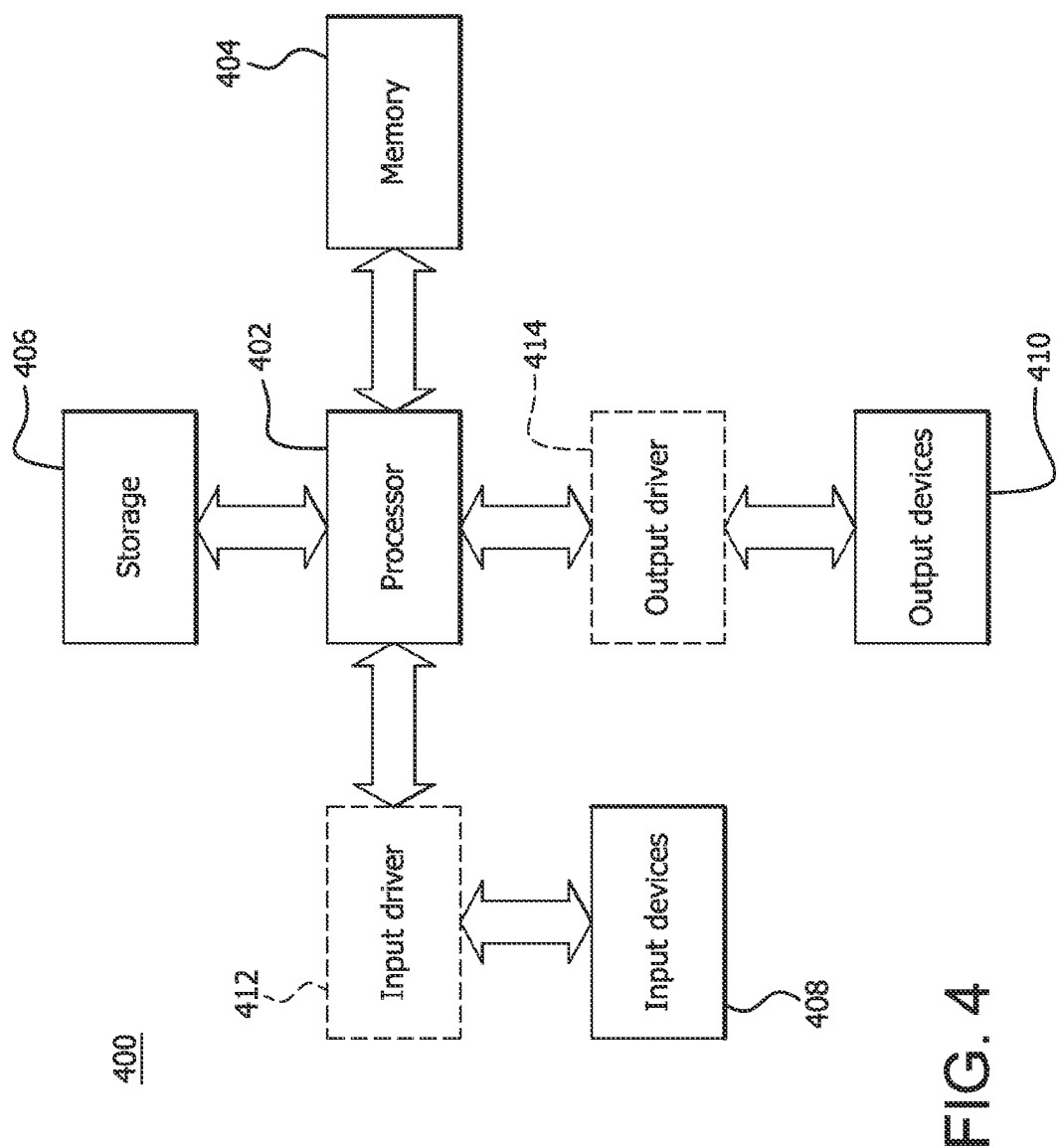
FIG. 4 is a block diagram of an example device in which one or more disclosed embodiments may be implemented.

FIG. 4 is a block diagram of an example device 400 in which one or more disclosed embodiments may be implemented. The device 400 may include, for example, a computer, a gaming device, a handheld device, a set-top box, a television, a mobile phone, or a tablet computer. The device 400 includes a processor 402, a memory 404, a storage 406, one or more input devices 408, and one or more output devices 410. The device 400 may also optionally include an input driver 412 and an output driver 414. It is understood that the device 400 may include additional components not shown in FIG. 4.

The processor 402 may include a central processing unit (CPU), a graphics processing unit (GPU), a CPU and GPU located on the same die, or one or more processor cores, wherein each processor core may be a CPU or a GPU. The memory 404 may be located on the same die as the processor 402, or may be located separately from the processor 402. The memory 404 may include a volatile or non-volatile memory, for example, random access memory (RAM), dynamic RAM, or a cache.

The storage 406 may include a fixed or removable storage, for example, a hard disk drive, a solid state drive, an optical disk, or a flash drive. The input devices 408 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 may include a display, a speaker, a printer, a haptic feedback device, one or more lights, an antenna, or a network connection (e.g., a wireless local area network card for transmission and/or reception of wireless IEEE 802 signals).

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the device 400 will operate in the same manner if the input driver 412 and the output driver 414 are not present.

The Front End unit (FE) in a processor is responsible for fetching instructions and sending the instructions to the Decode unit (DE). The FE includes two sub-units, Branch Prediction (BP) and Instruction Cache (IC). The BP sub-unit predicts a sequence of fetch addresses and the specific bytes to fetch at each address. The IC sub-unit performs page translation and fetches the specific bytes from the cache hierarchy. It is noted that the FE includes other sub-units and functionality, but such functionality is not relevant to the present disclosure and is not described further herein.

There are three main pipelines in the FE, the BP pipeline, the Instruction Tag (IT) pipeline, and the IC pipeline. There is a prediction queue (PRQ) between the BP pipeline and the IT/IC pipeline that decouples the BP pipeline and instruction fetching (IT/IC) pipelines. The BP pipeline generates prediction addresses and the PRQ holds the addresses until the IT/IC pipeline can process them. The PRQ is an in-order queue of fetch addresses. It is read and updated by the IT/IC pipeline.

Each cycle, a predicted virtual fetch address (Program Counter, PC) and a vector that represents recent branch behavior (Global History, GHist) flow down the BP pipeline. Each flow can discover up to the next 64 bytes to be fetched. The PC is used to look up an entry in the branch target buffer (BTB). The BTB entry identifies branches and predicts their targets. The PC and GHist are used to access the hash perceptron (HP) tables. The HP tables are used to predict the direction of conditional branches (i.e., taken or not taken).

Returns and variable target branches have additional structures that are used to assist in their prediction. If the BTB indicates that a taken branch is a call, then the address of the instruction after the call is pushed onto a stack. The associated return instruction will pop this address from the stack instead of using the predicted target from the BTB. If the BTB indicates that the branch has a variable target, then the fetch address and the global history are used to look up an address in an indirect target array (ITA).

Both the BTB and HP structures are implemented as two level structures. A change in the fetch direction (a redirect) that is predicted from the Level 1 (L1) BTB and L1 HP inserts one bubble (e.g., a "no operation") into the BP pipeline. If the branch is in the L1 BTB but has a variable target, is found in the L2 BTB, or if the L2 HP overrides the direction prediction from the L1 predictor, then three bubbles are inserted into the BP pipeline. Finally, a branch in the L2 BTB with a variable target inserts four bubbles into the BP pipeline.

In addition to these main predictors, there are two structures that are designed to improve the efficiency of the FE. As mentioned above, in the typical case, a taken or not taken branch introduces a bubble in the BP pipeline. In parallel with accessing the BTB and the HP, the PC and the GHist are used to read an entry from a BTB index predictor (BIP). This entry is used to predict the BTB and the HP array indices and is used to access these structures in the following cycle. When the BIP correctly predicts the next instruction's index, the bubble is squashed. There is a loop predictor that is constantly scanning the predicted address stream to attempt to find repeating loops. When the loop predictor locks onto a loop, the large prediction arrays can be turned off and the prediction may be made out of this smaller structure, at a rate of up to one taken branch per cycle.

As addresses are predicted, they are written to three different structures. Each address, along with branch and history information, is written to the branch status register (BSR). This is used to train the prediction structures when branches are discovered, mispredicted, and retired. Each address is written to the PRQ, so that the IC pipeline can fetch the associated data. Finally, each address is written to the fetch address first in first out (FIFO) queue (FaFifo) in the DE unit.

Each cycle, a predicted virtual fetch address (VA) from the PRQ flows down the IT pipeline. It accesses the first of two levels of an instruction translation lookaside buffer (ITLB) in an attempt to convert it to a physical address (PA). If successful, the IT pipeline next takes this physical address and uses that to access the IC. In parallel with the ITLB lookup, an access to the IC microtag (uTag) is started. This lookup is finished when the PA is obtained from the ITLB. The microtag predicts which way of the IC data arrays should be accessed (where the cache line may be located). In parallel with the data access, a full tag lookup is performed to qualify the microtag hit signals. The results of this flow (ITLB hit, partial PA, IC hit, IC way) are written back to the PRQ.

If there is an L1 ITLB miss, a translation lookaside buffer (TLB) miss address buffer (MAB) is allocated and a lookup in the L2 ITLB is attempted. If there is also a miss in the L2 ITLB, a page walk request to the load/store unit (LS) is initiated. Either the L2 ITLB hit entry or the result of the page walk request is installed in the L1 ITLB. If there is a miss in the instruction cache, an IC memory address buffer (MAB) is allocated and a fill request to the L2 ITLB for the missing line is sent. If the specific PA is cacheable (as indicated by the attributes of the page walk), when the data returns it is written into the IC. If the specific PA is uncacheable, the process waits for the address to be the oldest in the PRQ, and then forwards the resulting fetch data directly to the DE.

When there is a miss, younger entries in the PRQ are continued to be processed. This is an attempt to prefetch cache lines for fetches younger than the older fetch that missed.

The IC pipeline is a three stage pipeline that can fetch 32 bytes of instruction data per cycle. Each address in the PRQ, depending on the predicted start and end location within the 64 byte prediction window, needs either one or two flows down the IC pipeline to forward all of the data to the DE. A returning L2 cache miss that the oldest PRQ entry is waiting for can wake up the IC pipeline for that entry, and the L2 fill data can be bypassed directly to the DE while the data arrays are being updated.

All the prediction, tag, and cache pipelines handle simultaneous multithreading (SMT) by interleaving accesses from the two threads based on a thread prioritization algorithm. In general, the thread scheduling is performed independently within the BP, IT, and IC pipelines using a round robin technique. In a given cycle, if one of the threads is blocked and the other thread is available to be picked, the other thread will be picked in that cycle.

Figure 5:
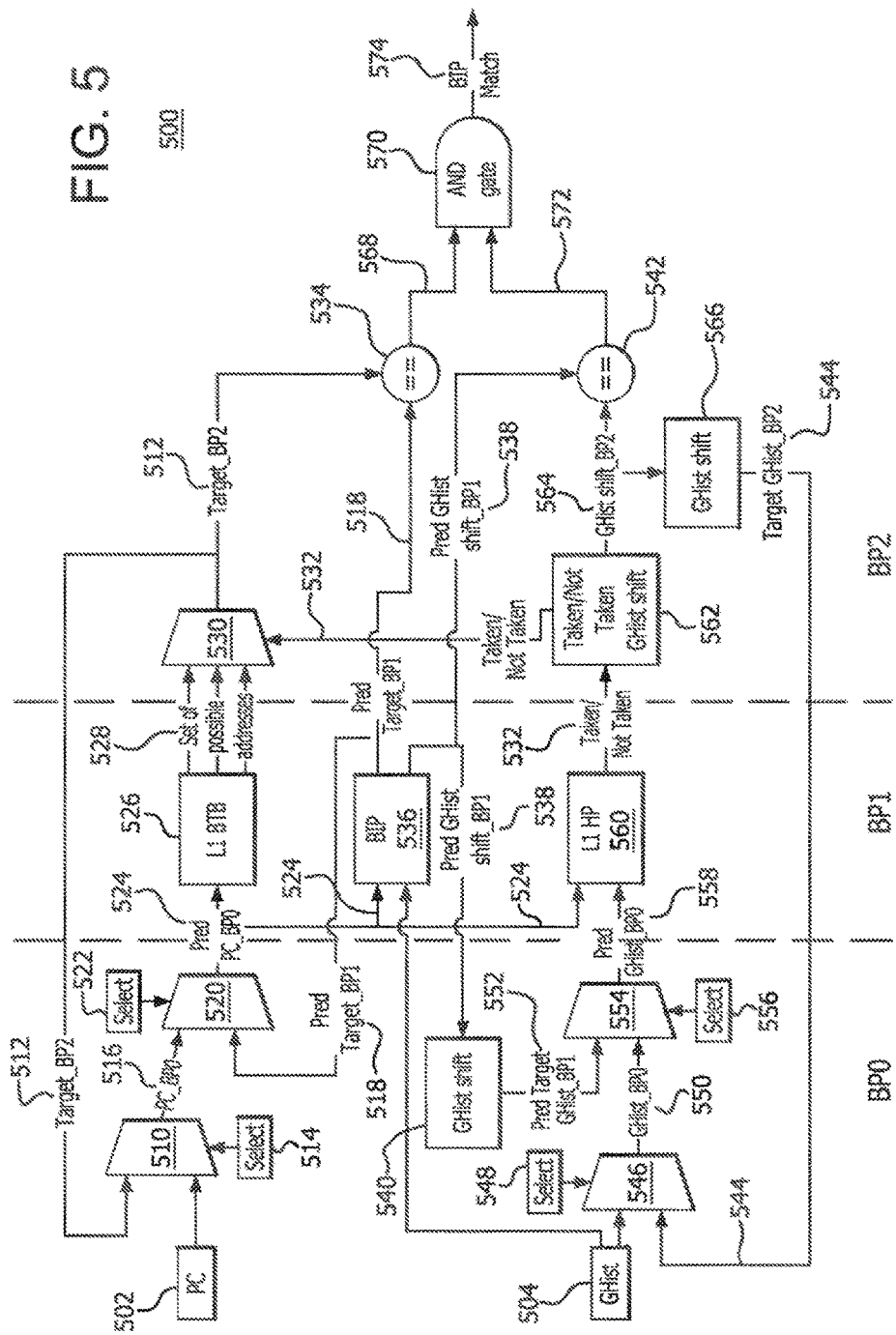
FIG. 5 is a block diagram of a BTB index predictor (BIP) and BTB way predictor.

FIG. 5 is a block diagram of a BTB index predictor and BTB way predictor. FIG. 5 shows only a portion of a processor 500 that implements the BTB index predictor and the BTB way predictor; there are other elements of the processor 500 that are not shown in FIG. 5 for clarity purposes. The labels at the bottom of FIG. 5—BP0, BP1, and BP2—indicate in which cycle of the BP pipeline the different components operate.

A program counter (PC) 502 and a global history (GHist) 504 are provided as inputs. A first multiplexer 510 receives the PC 502 and a target PC (Target_BP2) 512, and a select signal 514 selects either the PC 502 or the target PC 512 as a selected PC (PC_BP0) 516. The select signal 514 is based on a redirect from the execution (EX) unit or the decode (DE) unit, or on a higher priority prediction from later in the BP pipeline. It is noted that while the select signal 514 is derived from another portion of the processor 500, the connection lines to the potential sources of the select signal 514 are not shown for clarity purposes.

The selected PC 516 and a predicted target PC (Pred Target_BP1) 518 are supplied as inputs to a second multiplexer 520, and a select signal 522 selects either the selected PC 516 or the predicted target PC 518 as a predicted PC (Pred PC_BP0) 524. The select signal 522 is based on a redirect from the EX unit or the DE unit, on a higher priority prediction from later in the BP pipeline, or if there is a valid op in the BP2 cycle that has a BIP misprediction (indicating that the predicted target PC 518 is worthless, meaning that the selected PC 516 is selected). It is noted that while the select signal 522 is derived from another portion of the processor 500, the connection lines to the potential sources of the select signal 522 are not shown for clarity purposes.

The predicted PC 524 is supplied as an input (an index) to an L1 BTB 526, which generates a set of possible addresses 528. The set of possible addresses 528 is supplied as the inputs to a third multiplexer 530, and a select signal 532 (a taken/not taken signal, to be described below) selects one of the set of possible addresses 528 as the target PC 512, which is fed back to the first multiplexer 510 and fed forward to a first comparator 534.

The L1 BTB 526 is a set-associative structure, such that a lookup is performed. Some bits of the address are used to read the structure and some hashed bits of the address are used to compare to a tag to determine if there is a match with the address. The tag compare and the selection between several "ways" (several different possible results) take a lot of the time in the normal two-cycle lookup.

Every cycle, the L1 BTB 526 is read to predict the target PC 512. The target PC 512 is then used in the next flow to generate the index to read the L1 BTB again, to predict the next target PC. This could be in the same cache line or any non-sequential cache line followed by a taken branch. Since it takes time to generate the target PC from the first flow, the read of the L1 BTB for the next flow is delayed. To squash this bubble, a BTB index predictor (BIP) is used, as described below.

A typical prediction predicts one taken branch every two cycles. Each branch goes through the L1 BTB 526. In the next cycle (BP2), the target PC 512 needs to be determined and is flowed back two cycles (to BP0) into the multiplexers 510, 520 at the front of the L1 BTB 526. In summary, the possible addresses 528 are obtained from the L1 BTB 526, one of the possible addresses is picked (as the target PC 512), and the picked address flows back.

A combination of some bits of the predicted PC 524 and some bits of the GHist are supplied to a BTB index predictor (BIP) 536. In one implementation, this combination is an exclusive OR of the predicted PC 524 bits and the GHist bits. The BIP 536 generates a predicted target address (Pred Target BP_1) 518, which is fed back to the second multiplexer 520 and fed forward to the first comparator 534, and a predicted global history shift value (Pred GHist shift_BP1) 538, which is supplied to a first GHist shifter 540 and to a second comparator 542.

The BIP 536 is accessed in parallel to the L1 BTB 526. The L1 BTB 526 predicts the branch target of the current flow (which is also used to construct the BTB/hash perceptron (HP) index of the next flow), while the BIP 536 predicts a speculative partial target address (as a function of both VA[19:1] and the GHist) which is used to generate the index to perform the lookup into the L1 BTB 526 and the L1 HP 560. The BIP 536 is direct-mapped and is indexed by a hash of the virtual address and the global history, which allows the L1 BTB 526 and the L1 HP 560 to be read with the predicted index in the immediate following cycle. When the BIP prediction is correct, this squashes the taken and not taken branch bubble.

The L1 BTB 526 implementation (size and placement) and the L1 BTB read plus redirect timing constraints allow the L1 BTB prediction to be generated and read based off of the last L1 BTB redirect only every other cycle. For every L1 BTB redirect, this creates a bubble cycle between back-to-back L1 BTB reads. In an ideal situation, where there are two threads running every alternate cycle and occupying the L1 BTB in back-to-back cycles, this problem will not occur. In the case where there is only one active thread or back-to-back same thread allocation, there will be a bubble every second cycle, which hurts the performance.

In one implementation, the BIP 536 is a direct-mapped 256 entry structure, and entries are competitively shared. The BIP 536 is presented an index input, a value is obtained from the BIP, and it assumed that this value is correct. No further comparisons or qualifications are required at that moment. In next cycle, the result of the BIP 536 is used, and then it will be known whether it was the right result to use in that context (it is used before it is known whether it is correct). In one implementation of the physical layout of the processor, the BIP 536 is located near the L1 BTB 526 and the L1 HP 560.

Figure 6:
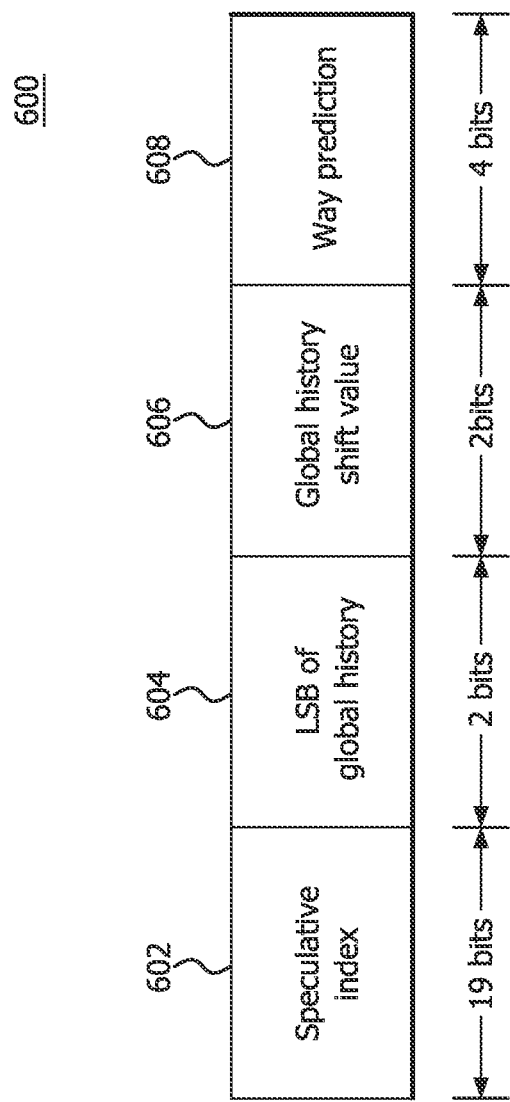
FIG. 6 is a diagram of a single entry in the BIP.

FIG. 6 shows the contents of a single entry 600 in the BIP 536. The entry 600 includes a speculative index 602, the least significant bits (LSB) of the global history 604, a global history shift value 606, and a way prediction 608.

The speculative index 602 may be 19 bits long and includes the lower VA bits 19:1. The BIP 536, the L1 BTB 526, and the L1 HP 560 need these bits to generate their read index for the next cycle flow.

The LSB of the global history 604 may be two bits long and is used to predict the next cycle speculative global history value, which is needed by the BIP 536, the L1 BTB 526, and the L1 HP 560 for generating the read index.

The global history shift value 606 may be two bits long and helps to build the global history table and indicates either to shift the LSB of the global history by 0,1, or 2 bits. If the global history shift value 606 is greater than zero, then the shift amount and the values to be shifted in are supplied. Each conditional branch shifts in a 0 or a 1 into the global history table depending on whether the branch is taken or not. For example: if there is one not taken branch, then a 0 is shifted in; if there is one taken branch, then a 1 is shifted in; etc.

The way prediction 608 may be four bits long and is used to predict the L1 BTB way (one-hot) that will most likely store the information (VA, GHist, Way) needed for the next flow. If all four bits of the way prediction 608 are set, all ways of the L1 BTB and the L2 BTB are read to confirm a BTB miss.

Referring back to FIG. 5, using the BIP index prediction, one taken branch is predicted every cycle. The BIP 536 gets indexes, and is looked up the same manner that the L1 BTB 526 is looked up. The result of the lookup (the predicted target PC 518) is immediately multiplexed back to the input (via the multiplexer 520), and enables another lookup of the L1 BTB 526 in the next cycle. The predicted target PC 518 is less accurate than the target PC 512 that comes out of the L1 BTB 526, but when the predicted target PC 518 is correct, one prediction can be made every cycle. In the next cycle, for each prediction, the "quick" prediction that came out of the BIP 536 is checked to determine whether it is correct. If it is correct, then it does not have to be thrown away. If it is incorrect, then throw it away (by not selecting it out of the multiplexer 520) and go back to previous behavior of predicting one branch every two cycles.

A potential "problem" existing with sequential predictions (for example, in a section of code with no branches) is that the processing is still subject to the BIP's attempted prediction, which could slow down the processing by taking two cycles, even though no branches need to be predicted. But overall, there is a net performance gain.

The L1 BTB 526 is indexed with bits of a hashed version of the address being fetched. The L1 HP 560 is hashed with a combination of the address being fetched and the history of the last several branches that were predicted. The BIP 536 is more like the hash perceptron in this matter, in that the BIP 536 is hashed with a combination of address bits and history bits. The optimal number of history bits used is small; for example, as noted above, two history bits are used in one implementation. Hashing the history bits into the result helps obtain a better prediction than by using just the address bits.

The predicted target PC 518 that comes out of the BIP 536 is an index (instead of just being an address) that is immediately fed back into the BIP 536 and the L1 BTB 526 for the next access. The predicted index is read out of the BIP 536 and the possible addresses 528 are read out of the L1 BTB 526. Both pieces of information are fed to the next cycle, and a comparison is made (at the first comparator 534) to determine whether the target address (target PC 512) and the resulting index match the predicted index (predicted target PC 518).

The general training of the BIP 536 is done in the prediction pipeline. When the predicted target PC 518 is obtained, the index is computed from that, and the predicted target PC 518 is written back to the BIP 536 at that index. When the execution flow returns to the same spot in code (for example, based on the same recent history), what is read from the BIP 536 reflects the knowledge at that moment (of the last time the code was at this point). There is a fairly quick turnaround, from the time when a branch is predicted by the BIP 536 to when it is written to the BIP for training. Because this is such a speculative structure and it can be immediately confirmed whether it was accurate or not, the downside of quick training is not large.

The GHist 504 and a target shifted GHist (Target GHist_BP2) 544 are supplied to a fourth multiplexer 546, and a select signal 548 is used to select either the GHist 504 or the target shifted GHist 544 as a global history prediction (GHist_BP0) 550. The select signal 548 is based on a redirect from the EX unit or the DE unit, or on a higher priority prediction from later in the BP pipeline. It is noted that while the select signal 548 is derived from another portion of the processor 500, the connection lines to the potential sources of the select signal 548 are not shown for clarity purposes.

The first GHist shifter 540 applies the predicted GHist shift 538 to shift the global history and generates a predicted target global history (Pred Target GHist_BP1) 552. The GHist prediction 550 and the predicted target GHist 552 are supplied to a fifth multiplexer 554, and a select signal 556 is used to select either the GHist prediction 550 or the predicted target GHist 552 as a predicted global history (Pred GHist_BP0) 558. The select signal 556 is based on a redirect from the EX unit or the DE unit, on a higher priority prediction from later in the BP pipeline, or if there is a valid op in the BP2 cycle that has a BIP misprediction. It is noted that while the select signal 556 is derived from another portion of the processor 500, the connection lines to the potential sources of the select signal 556 are not shown for clarity purposes.

The predicted GHist 558 is supplied to the L1 hash perceptron (HP) 560, which generates the taken/not taken signal 532. The taken/not taken signal 532 is provided to a taken/not taken GHist shifter 562, which forwards the taken/not taken signal 532 to the third multiplexer 530 and generates a global history shift value (GHist shift_BP2) 564 to the second comparator 542 and to a second GHist shifter 566. The second GHist shifter 566 uses the GHist shift value 564 to generate the target GHist 544 and forwards the target GHist 544 to the fourth multiplexer 546.

The first comparator 534 compares the target PC 512 and the predicted target PC 518 to determine whether they match, and outputs a match value 568 to an AND gate 570. The second comparator 542 compares the predicted GHist shift value 538 and the GHist shift value 564 to determine whether they match, and outputs a match signal 572 to the AND gate 570. The AND gate 570 outputs a BIP match signal 574.

If both comparators 534, 542 indicate a match, then the BIP match signal 574 indicates a positive match (that the BIP 536 made a correct prediction) and nothing needs to be flushed from the pipeline. If both comparators 534, 542 do not indicate a match, then the BIP match signal 574 indicates that the BIP prediction was incorrect, and then flush out the flow from the pipeline and feed back the target address 512 from the BP2 cycle back into the BP0 multiplexer 510.

This is a significant improvement in the throughput. Without the BIP 536, there will be a bubble in the pipeline. If front end of the branch predictor is limiting the throughput of the machine, there would be a bubble every cycle. Using the BIP 536 plugs the holes, so there is a continuous stream of instructions and there are fewer front end bubbles. The value of using the BIP increases as the machine gets wider, as it attempts to process more instructions each cycle, by helping to keep the machine full.

FIG. 7 is a flowchart of a method 700 using the BIP to generate a BP match signal. An index to be used to perform a lookup in the BTB, BIP, and HP is generated (step 702). It is noted that the following steps (704, 710, and 712) can be performed in parallel, but for purposes of explanation are described separately.

The index is used to perform a lookup in the BTB to generate a set of possible addresses (step 704). A target PC is selected from the set of possible addresses (step 706). The target PC is used to generate the index to be used in the next flow (step 708), and this portion of the method 700 returns to step 702 to generate the index for the next flow.

The index is also used to perform a lookup in the BIP to generate a predicted target PC and a global history (GHist) shift (step 710). The index and the GHist are used to perform a lookup in the HP to generate a taken/not taken signal (step 712). The GHist is updated based on the taken/not taken signal (step 714) and the updated GHist is used in subsequent lookups of the HP. The taken/not taken signal is also used to generate a GHist shift (step 716).

The target PC from the BTB and the predicted target PC from the BIP are compared to generate a first match signal (step 718). The GHist shift from the BIP and the GHist shift from the HP are compared to generate a second match signal (step 720). The first match signal and the second match signal are logically ANDed together to generate a BP match signal (step 722), and the method terminates (step 724).

L1 BTB Way Predictor

The BIP 536 is also used to predict the L1 BTB way as described above, in a manner similar to the index prediction. Part of the output of the BIP 536 (the way prediction 608) tells which "ways" to look at for a hit result. All ways but the predicted L1 BTB way are turned off to save read power on the L1 BTB. The L2 BTB (not shown in FIG. 5) ways are also turned off to save L2 BTB power.

In the case where the BIP way prediction 608 predicts "1111," in addition to reading all of the L1 BTB ways, the L2 BTB is powered up and read. This allows the BTB miss case to also be predicted.

If there is no L1 BTB hit, and the "1111" combination has not been predicted and therefore searched in all possible BTB locations, a BIP reflow is performed to make certain that there is a BTB miss. Instead of redirecting to the target PC, this case cancels itself, and does a L1 redirect back to itself, but with a force read condition that causes the entire L1 BTB and the entire L2 BTB to be read.

The training for this portion of the BIP is more complicated. The index from the current flow is taken and fed into the next flow. The BTB is read with the index and it is determined which way the next flow hits in the BTB, and that is the way to be read out.

At the end of the pipeline, the index used for this prediction and the target or index of the next prediction are collected. The index of the next prediction is put into the BIP, the next flow's BTB hit information is gathered (to see which way it hits in), and that information is written into the BIP with this prediction.

In a first example: The code is in a loop and a given branch is in way 3 of the BTB. The BIP is trained to point to that index and to way 3. Then each iteration through the loop, instead of reading all four ways of the BTB to look for that result, only way 3 needs to be read. When the prediction is correct, it saves power because it predicts that there will be a hit and predicts the way in which the hit is, and the non-predicted ways can be powered off. The L2 BTB structure can be entirely turned off, because it is known that there will be a hit in the L1 BTB, so the L2 BTB will not be needed.

In a second example: In cases where a miss in the BTB is expected (like with sequential fetches, where no address is stored in the BTB), the BIP is trained to read all four ways. If all four ways are read out of the BTB, it can be confirmed that there were no hits, which is an indication that the BIP way prediction was useful.

There is a downside, in that if that BIP indicates to read "way 3" and there is a miss (meaning that it is possible that the branch was in one of the other ways), then that flow needs to be redone to look for that branch in all ways. Usually, when the BIP prediction has the incorrect way, it also has the incorrect index, so that flow would have been flushed most of the time by the BIP index matching mechanism.

The BIP way predictor as described herein is fundamentally different from a cache way predictor. The BIP's prediction is more like a continuation of its index predictor, i.e., the index predictor provides M bits of the index, and the way predictor augments this with a specific way. One lookup in the BIP directs the hardware's next BTB lookup. So one flow using BIP way prediction would read one BIP entry, which then points to one (or more) BTB way(s) to read. The cache way predictor, on the other hand, has an entry for each entry in the cache, which is looked up in series with the data and the tag. For an N way set associative cache, N entries would be looked up in the way predictor, with the hope that the result of this lookup indicates that there are less than N entries in the cache itself.

Decoupling of the IT and IC Pipes

FIG. 8 is a block diagram of instruction tag (IT) and instruction cache (IC) pipelines in a portion of a processor 800. FIG. 8 shows only the portion of the processor 800 that implements the IT pipeline and the IC pipeline; there are other elements of the processor 800 that are not shown in FIG. 8 for clarity purposes. The labels at the bottom of FIG. 8—IT0, IT1, IT2, IC0, and IC1—indicate in which cycle of the IT pipeline and IC pipeline the different components operate.

A predicted PC 802 is supplied to a L1 ITLB 804 and to a uTag lookup device 806. If there is a hit in the L1 ITLB, the L1 ITLB outputs a physical address (PA) 808. The PA 808 is supplied to a first comparator 810, a select PA device 812, a tag lookup device 814, and a second comparator 816.

The uTag lookup device 806 uses the predicted PC 802 to generate a uTag 818, which is supplied to the first comparator 810. The uTag lookup is started in the IT0 cycle and is finished in the IT1 cycle. The first comparator 810 compares the PA 808 and the uTag 818 to generate a match signal 820. The match signal 820 is supplied to the tag lookup device 814 and a select way device 822.

The select way device 822 uses the predicted PC 802 and the match signal 820 to select a way 824 in an instruction cache 826. The hit information from the first comparator 810 indicates that the way 824 is a way in the IC 826 that might have useful data; the hit is based on a subset of the tag bits of that cache entry. The select PA device 812 uses the predicted PC 802 and the PA 808 to generate a selected PA 828. The instruction cache 826 uses the way 824 and the selected PA 828 to select an instruction 830 for processing.

The tag lookup device 814 uses the PA 808 and the match signal 820 to select a tag 832, which is supplied to the second comparator 816. The second comparator 816 uses the PA 808 and the tag 832 to generate a hit signal 834.

In the IT2 cycle, the tag lookup is finished. For everything that there is a partial match, the rest of the tag is read out to confirm that there is a full match. It will then be known for sure that this location in the cache is the one that has the data that is being looked for. Usually, the partial hit has enough information that can be used to control reading the data out of the cache. If the partial tag results in multiple hits, then the rest of the tag read out for each way can be compared to the full address to obtain the full, qualified hit signal in the next cycle (this is what needed to be done when the IT and IC pipelines were coupled). After this, the data array (instruction cache) can be re-read to read the correct entry.

At the end of the IT pipeline, if there is a hit, store that information (the address and the way it was found in) in the PRQ. Later, that data needs to be read out of the cache, a full tag lookup does not need to be performed. Only the index and the way that was hit on previously need to be read out of the PRQ and that information can be used to access the data array. So the tag pipeline and tag accesses can be split from when the data array is accessed.

With a cache miss or fetches that get more than half a cache line (i.e., a long fetch), the tag pipeline will run immediately as each address (the predicted PC 802) shows up from the BP pipeline. Then the IC pipeline has to do two picks for every fetch (instead of one), so it will get behind the IT pipeline, even though the IC pipeline can pick independently.

If the DE pipeline (which follows the IT and IC pipelines) fills up, tag lookups can still be performed (to determine a hit or a miss), without powering up the data array to send the data to the DE pipeline.

If the IT pipeline is several fetches ahead of the IC pipeline, then there is an advantage. If there is now a cache miss, this is learned in the IT pipeline. The request is sent to the L2 cache, so when the IC pipeline catches up and wants to use that data, it is possible that the data has come back from the L2 cache (and can line up with where the IT pipeline wanted to flow). In other words, more prefetch behavior may be obtained.

The impact of decoupling the IT pipeline and the IC pipeline is similar to what is done in other parts of the machine. Namely, that decoupling the pipelines hides the bubbles or reduces the impact of the bubbles. Because there are two different pipelines (which each can stall for independent reasons), it is undesirable for the effect of the bubbles to add up. Without decoupling, if there is a bubble in one pipeline, it will progress through the pipeline and to other dependent pipelines.

If the IC pipeline is picked immediately with IT pipeline, more ways of the data cache would have to be powered up than would otherwise be necessary, and this would have to be done all the time. As soon as the tag pipeline gets ahead of data pipeline, the data pipeline can more precisely power up portions of the instruction cache data arrays that it needs to read data out of.

A side effect of the decoupling is using the PRQ to store indexes and ways that there may have been a hit on. If there is an operation that removes that line from the cache, in addition, the hit indication in the PRQ has to be changed to "not hit." Using the PRQ in this manner would involve some record keeping overhead (information out of the IT pipeline is stored in the PRQ), because this record will need to be maintained. If the tag entry gets invalidated, then the entry in the PRQ will also have to be invalidated.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor, comprising:
    a front end unit, including:
        a branch prediction (BP) pipeline;
        first selection circuitry that selects an index based on an input program counter, a prior speculative partial target address, and a prior target address;
        a level 1 branch target buffer (BTB) that generates a first predicted program counter based on the index;
        a BTB index predictor (BIP) that generates a prediction based on the index and a global history, wherein the prediction includes a second predicted program counter, a first predicted global history shift value, and a way prediction;
        a level 1 hash perceptron (HP) that generates a second predicted global history shift value and a taken signal based on the index, wherein the taken signal indicates an estimation of whether a branch instruction is taken or not taken;
        a first comparator that compares the first predicted program counter and the second predicted program counter to generate a first match signal;
        a second comparator that compares the first predicted global history shift value and the second predicted global history shift value to generate a second match signal, wherein the first match signal and the second match signal are generated in parallel; and
        a logic gate that generates a BP compare signal by comparing the first match signal and the second match signal, wherein the BP pipeline is selectively flushed based on the BP compare signal;
    wherein the first predicted program counter, the prediction and the taken signal are generated in parallel during a same branch prediction cycle.

2. The processor according to claim 1, wherein the BIP further combines the index and the global history to generate the prediction.

3. The processor according to claim 2, wherein the BIP further performs an exclusive OR operation to combine the index and the global history.

4. The processor according to claim 2, wherein the BIP further uses a hash function to combine the index and the global history.

5. The processor according to claim 1, wherein the second predicted program counter from the BIP is received by the first selection circuitry and used in a cycle immediately following the prediction as the prior speculative partial target address.

6. The processor according to claim 1, wherein:
    the prior speculative partial target address is received from the BIP, and the prior target address is received from the BTB.

7. The processor according to claim 1, wherein the front end unit further includes:
    second selection circuitry that selects the global history from an input global history, the first global history shift value from the BIP, and a target global history.

8. The processor according to claim 1, wherein the BTB further turns off all ways but the way prediction.

9. The processor according to claim 1, wherein the BTB further reads a way based on the way prediction from an immediately preceding cycle.

10. The processor according to claim 1, further comprising:
    an instruction tag (IT) pipeline that is in parallel with the BP pipeline; and
    an instruction cache (IC) pipeline in communication with the IT pipeline, but separate from the IT pipeline such that the IT pipeline and the IC pipeline can operate independently of each other.

11. A method for performing branch prediction, the method comprising:
- generating, by first selection circuitry of a processor, an index based on an input program counter, a prior speculative partial target address, and a prior target address;
- performing, by a level 1 branch target buffer (BTB) of the processor, a lookup in the BTB using the index to predict a first predicted program counter;
- predicting, by a BTB index predictor (BIP) of the processor, a prediction by performing a lookup in the BIP using the index and a global history, wherein the prediction includes a second predicted program counter, a first predicted global history shift value, and a way prediction;
- generating, by a level 1 hash perceptron (HP) of the processor, a second predicted global history shift value and a taken signal that indicates an estimation of whether a branch is taken or not taken by performing a lookup in the HP using the index;
- comparing, by a first comparator of the processor, the first predicted program counter and the second predicted program counter to generate a first match signal;
- comparing, by a second comparator of the processor, the first predicted global history shift value and the second predicted global history shift value to generate a second match signal, wherein the first match signal and the second match signal are generated in parallel; and
- selectively flushing a branch prediction (BP) pipeline based on a comparison of the first match signal and the second match signal;
- wherein the performing, the predicting, and the generating by the HP are performed in parallel during a same branch prediction cycle.

12. The method according to claim 11, wherein the predicting includes:
- using the index to generate a set of possible addresses; and
- selecting the second predicted program counter from the set of possible addresses.

13. The method according to claim 11, further comprising updating the global history based on the taken signal.

14. The method according to claim 11, wherein the first predicted global history shift value is predicted by performing a lookup in the BIP using the index.

15. The method according to claim 11, further comprising:
- predicting, by the BTB, a way prediction by performing a lookup in the BIP using the index.

16. The method according to claim 15, further comprising:
- turning off all ways in the BTB but the way prediction.

17. The method according to claim 15, further comprising:
- reading the way in the BTB based on the way prediction from an immediately preceding cycle.

18. A non-transitory computer-readable storage medium storing a set of instructions for execution by a general purpose computer to perform branch prediction in a processor, the set of instructions comprising:
- a generating code segment for generating an index based on an input program counter, a prior speculative partial target address, and a prior target address;
- a first performing code segment for performing a lookup in a level 1 branch target buffer (BTB) of the processor using the index to predict a first predicted program counter;
- a second performing code segment for performing a lookup in a BTB index predictor (BIP) of the processor using the index to predict a prediction, wherein the prediction includes a second predicted program counter, a first predicted global history shift value, and a way prediction;
- a third performing code segment for performing a lookup in a level 1 hash perceptron (HP) of the processor using the index to generate a second predicted global history shift value and a taken signal that indicates an estimation of whether a branch is taken or not taken;
- a first comparing code segment for comparing the first predicted program counter and the second predicted program counter to generate a first match signal;
- a second comparing code segment for comparing the first predicted global history shift value and the second predicted global history shift value to generate a second match signal, wherein the first match signal and the second match signal are generated in parallel; and
- a flushing code segment for selectively flushing a branch prediction (BP) pipeline based on a comparison of the first match signal and the second match signal;
- wherein the first performing, the second performing and the third performing are performed in parallel during a same branch prediction cycle.

19. The non-transitory computer-readable storage medium according to claim 18, wherein the instructions are hardware description language (HDL) instructions used for manufacturing a device.

* * * * *